United States Patent
Chang et al.

(10) Patent No.: US 9,448,122 B2
(45) Date of Patent: Sep. 20, 2016

(54) MULTI-POINT TEMPERATURE SENSING METHOD FOR INTEGRATED CIRCUIT CHIP AND SYSTEM OF THE SAME

(71) Applicant: NATIONAL CHENG KUNG UNIVERSITY, Tainan (TW)

(72) Inventors: Soon-Jyh Chang, Tainan (TW); Guan-Ying Huang, Tainan (TW); Kuen-Jong Lee, Tainan (TW); Wen-Yu Su, Tainan (TW); Chung-Ho Chen, Tainan (TW); Lih-Yih Chiou, Tainan (TW); Chih-Hung Kuo, Tainan (TW); Chien-Hung Tsai, Tainan (TW); Chia-Min Lin, Tainan (TW)

(73) Assignee: National Cheng Kung University, Tainan (TW)

( * ) Notice: Subject to any disclaimer, the term of this patent is extended or adjusted under 35 U.S.C. 154(b) by 477 days.

(21) Appl. No.: 14/045,988

(22) Filed: Oct. 4, 2013

(65) Prior Publication Data
US 2014/0341258 A1 Nov. 20, 2014

(30) Foreign Application Priority Data
May 16, 2013 (TW) .............................. 102117410 A (51) Int. Cl.
*G01K 7/01* (2006.01)

(52) U.S. Cl.
CPC ...................... *G01K 7/01* (2013.01)

(58) Field of Classification Search
CPC ................... G01K 7/01; G01K 7/021
See application file for complete search history.

(56) References Cited

U.S. PATENT DOCUMENTS

| | | | | |
|---|---|---|---|---|
| 6,283,628 B1* | 9/2001 | Goodwin | ............... | G01K 15/00 374/1 |
| 2005/0074051 A1* | 4/2005 | Won | ....................... | G01K 3/005 374/170 |
| 2005/0197795 A1* | 9/2005 | Aas | ....................... | G01R 35/005 702/107 |
| 2006/0006987 A1* | 1/2006 | Hashimoto | .......... | G06K 7/0008 340/10.51 |
| 2006/0242348 A1* | 10/2006 | Humphrey | .......... | G06F 13/4291 710/305 |
| 2006/0285575 A1* | 12/2006 | Park | ....................... | G01K 1/026 374/141 |
| 2007/0080702 A1* | 4/2007 | Fishman | ............ | G01R 31/3171 324/750.11 |
| 2007/0182469 A1* | 8/2007 | Zimlich | ................ | H03L 7/0814 327/158 |
| 2008/0144415 A1* | 6/2008 | Macerola | ................. | G01K 7/01 365/211 |
| 2009/0112503 A1* | 4/2009 | Hattis | ....................... | G01K 3/14 702/99 |

(Continued)

*Primary Examiner* — Lisa Caputo
*Assistant Examiner* — Philip Cotey
(74) *Attorney, Agent, or Firm* — Rosenberg, Klein & Lee (57) ABSTRACT

A multi-point temperature sensing method for integrated circuit chips and a system of the same are revealed. The system includes at least one slave temperature sensor embedded at preset positions for measuring temperature of a block and a master temperature sensor embedded in an integrated circuit chip and electrically connected to each slave temperature sensor. Variations of the slave temperature sensor induced by variations of process, voltage and temperature are corrected by the master temperature sensor. Thus the area the temperature sensors required on the integrated circuit chip is dramatically reduced and the stability of the temperature control system is improved. The problem of conventional System-on-a-Chip that only a limited number of temperature sensors could be used due to the area they occupied can be solved.

13 Claims, 11 Drawing Sheets

(56) References Cited

U.S. PATENT DOCUMENTS

| | | | |
|---|---|---|---|
| 2009/0172242 A1* | 7/2009 | Piasecki | G06F 13/4208 710/317 |
| 2011/0029266 A1* | 2/2011 | Lee | H03F 1/30 702/64 |
| 2011/0050108 A1* | 3/2011 | Lin | H05B 37/029 315/152 |
| 2011/0187428 A1* | 8/2011 | Kashmiri | H03L 1/022 327/159 |
| 2011/0234300 A1* | 9/2011 | Zhang | G01K 7/01 327/512 |
| 2011/0301909 A1* | 12/2011 | Jackson | G01K 13/00 702/133 |
| 2011/0302351 A1* | 12/2011 | Aybay | H04L 12/403 711/1 |
| 2012/0116696 A1* | 5/2012 | Wank | G01R 31/42 702/58 |
| 2015/0369764 A1* | 12/2015 | Chang | G01K 15/005 374/1 |

* cited by examiner

MULTI-POINT TEMPERATURE SENSING METHOD FOR INTEGRATED CIRCUIT CHIP AND SYSTEM OF THE SAME

BACKGROUND OF THE INVENTION

1. Field of the Invention

The present invention relates to a multi-point temperature sensing method for integrated circuit chips and a system of the same, especially to a multi-point temperature sensing method for integrated circuit chips and a system of the same in which a master temperature sensor with a large area and a certain precision is used to correct other slave temperature sensors having a smaller area and a lower precision so as to reduce the area the temperature sensors required in integrated circuit chips dramatically and further improve stability of a temperature control system in integrated circuit chips.

2. Description of Related Art

Along with fast development of integrated-circuit technology, more and more transistors are placed on a single chip. According to Moore's law, the number of transistors on integrated circuits doubles every 18 months. With the advancement of manufacturing processes, the size of semiconductor devices moves from deep submicron- to nanometer scale. An increasing number of logic gates are packed on a single chip. That means more and more functions are integrated on the single chip. Trends in the Very Large Scale Integration (VLSI) technology include more transistors, faster clock rate, lower supply voltage, more circuit layers, and more I/O pins. These trends enable microprocessors, memories, digital signal processors (DSP) and various interfaces included in complicated multi-chip systems to be integrated into a single chip and a System-on-a-Chip (SoC) is formed. However, the complicated functions and the increasing chip density result in excessive power consumption and associated thermal problems. In order to make the SoC operate properly and avoid thermally induced errors or even damages in the SoC, there is a need to provide a method for monitoring the temperature of the SoC and a system of the same.

Generally, an embedded temperature sensor used in SoC is single-point detection. Refer to Taiwanese Pat. Pub. No. I368839 "system for control of chip temperature and method of the same", the system uses an oscillation ring to detect operating temperature of the chip. Not only the temperature of the chip is detected, the temperature of the chip is also modulated dynamically. The system for control of chip temperature includes at least one temperature sensing unit and a dynamic voltage regulator controller. The temperature sensing unit is built in the chip and is composed of an oscillation ring, a counter and decoder. The oscillation ring has an oscillation frequency that is inversely proportional to the temperature of the chip. The counter is electrically connected to the oscillation ring for recording the oscillation frequency and calculating a value according to the oscillation frequency. The decoder is electrically connected to the counter for determining voltage provided to the chip according to the calculated value. The dynamic voltage regulator controller is electrically connected to the temperature sensing unit for dynamically adjusting the voltage provided to the chip according to determination of the decoder. Thereby the system is easy to be integrated into the design of the chip so as to achieve temperature detection and dynamic modulation. Moreover, the temperature of the chip is monitored in a real time manner so as to regulate the voltage and the clock rate accordingly. Thus the reliability and yield rate of the chip are improved significantly and the optimal operation performance of the chip is ensured. However, the SoC generally includes a plurality of circuits with different functions. Each circuit has different power and temperature corresponding to the function. In order to monitor the temperature of each block of the circuit effectively and prevent circuit malfunction caused by the temperature, there is a need to have a multi-point temperature sensing mechanism in the circuit.

Figure 11:
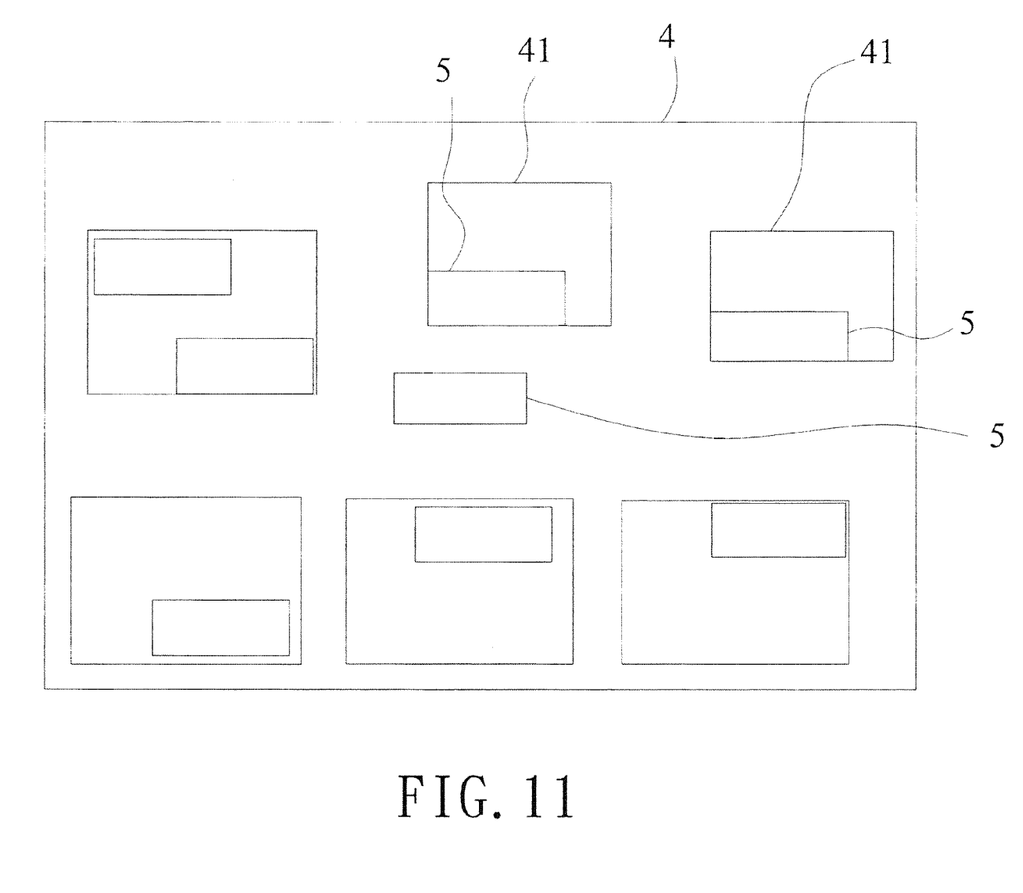
FIG. 11 is a schematic drawing showing structure of a conventional multi-point temperature sensing system used in an integrated circuit chip.

Basically, a temperature sensor with certain precision has a circuit for generating a signal that changes with temperature and having high linearity. Then the signal is converted into digital code to be processed by a digital circuit at the rear end. However, the circuit is usually quite complicated and having a larger area for generating the signal that changes with temperature and having high linearity. This is a great burden for a system that requires several temperature sensors. Refer to FIG. 11, a schematic drawing showing a conventional multi-point temperature sensing system used in integrated circuit (IC) chips. An integrated circuit chip 4 includes a plurality of blocks 41 that execute specific functions respectively. In the block 41, there are many hot spots that need to be monitored by temperature sensors 5. The temperature sensor 5 with certain precision needs a large area. This is due to that most of the temperature sensor 5 uses conventional proportional to absolute temperature (PTAT) circuit to generate PTAT current. Then the current is delivered to resistors in series and temperature voltage with positive temperature coefficient (PTC) is obtained from a plurality of end points of the resistors in series. Next the temperature sensor 5 catches the corresponding temperature voltage and compares the temperature voltage with reference voltage by means of multiplexer and comparator so as to detect ambient temperature. However, the resistors in series occupy a larger area on the chip to have more precise resistance value if users want to get the temperature voltage generated while the current flowing through the resistors in series. These resistors in series are also affected by offset in semiconductor processing. Moreover, during the design of the resistors in series, a pull-up resistor electrically connected to ground potential needs a larger resistance value than other resistors in series so as to pull up the temperature voltage greatly. Thus the temperature voltage and the reference voltage can be compared. The circuit area of the temperature sensor 5 is further increased. Generally, one temperature sensor 5 placed in the block 41 may occupy up to one third (⅓) area thereof. Thus it's unable to arrange many temperature sensors 5 in one block 41. And the stability as well as reliability of the whole temperature control system of the integrated circuit chip is reduced and the damage probability caused by high temperature is increased. There is a need to provide a novel multi-point temperature sensing system that overcomes the shortcomings of the prior art mentioned above.

SUMMARY OF THE INVENTION

Therefore it is a primary object of the present invention to provide a multi-point temperature sensing method for integrated circuit chips and a system of the same in which a master temperature sensor having a large area and a certain precision is used to correct slave temperature sensors with a smaller area and a lower precision. Thus the area the temperature sensors required in an integrated circuit chip is reduced significantly and the stability of a temperature control system in the integrated circuit chip is further improved.

In order to achieve the above object, a multi-point temperature sensing system for integrated circuit chips according to the present invention is provided. An integrated circuit chip includes a plurality of blocks each of which executes specific functions. The system includes at least one slave temperature sensor embedded at preset positions for measuring temperature of the block and a master temperature sensor embedded in the integrated circuit chip and electrically connected to each slave temperature sensor. The master temperature sensor is used to correct variations of the slave temperature sensor induced by variations of process, voltage and temperature. Although the linearity of the slave temperature sensor is not high and is easy to have offset with the process, it has simple structure and small area. The layout area of the slave temperature sensor is around one fortieth ($\frac{1}{40}$) of that of the master temperature sensor (e.g. about $\frac{1}{39}$). Thus the area of the temperature sensors occupied in the IC chip is dramatically reduced. Therefore the temperature sensors can be used in each block of the IC chip 1 in a larger amount without occupying too much area.

The master temperature sensor is composed of a PTAT (proportional to absolute temperature) bias generator and an analog-to-digital conversion module that receives signals from the PTAT bias generator. The analog-to-digital conversion module is preferably a successive approximation analog-to-digital converter (SAR ADC). Moreover, the PTAT bias generator includes a PTAT reference voltage generator circuit having a pair of bipolar junction transistors (BJT), a buffer circuit that receives signals output from the PTAT reference voltage generator circuit and an operational amplifier circuit that receives and amplifies signals output from the buffer circuit.

As to the slave temperature sensor, it consists of an oscillator and a counter electrically connected to the oscillator. The oscillator has an oscillation frequency that is controlled by a logic coding circuit and is changed linearly along with the temperature being detected. The counter records the oscillation frequency and outputs counting results.

Furthermore, the present invention also provides a multi-point temperature sensing method for integrated circuit chips. The method includes a plurality of steps. First embed at least one slave temperature sensor in blocks of an integrated circuit chip so that each preset position for measuring temperature of the block is arranged with slave temperature sensor. Then mount a master temperature sensor in the integrated circuit chip and the master temperature sensor is electrically connected to each slave temperature sensor. Variations of the slave temperature sensor induced by variations of process, voltage and temperature (PVT) are corrected by the master temperature sensor. When the slave temperature sensor has output offset/variation due to process, voltage and temperature (PVT) variations, the offset/variation is reduced by output of the master temperature sensor in the way of offset correction. While the master temperature sensor correcting the variations of the slave temperature sensor caused by PVT variations, continuity of tangency is further used for smoothing. Thereby the area the temperature sensors require in the integrated circuit chip is significantly reduced and the stability of the temperature control system is increased. The problem of conventional System-on-a-chip (SoC) that only a limited number of temperature sensors could be used due to the area they occupied can be solved.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
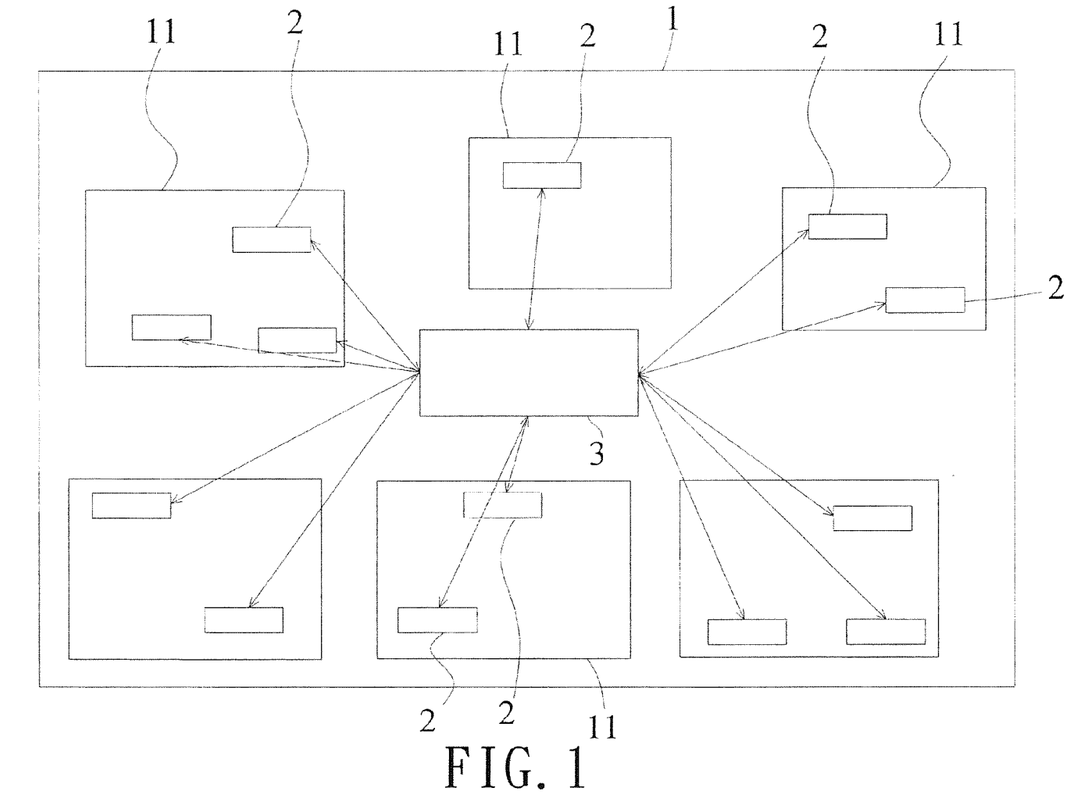
FIG. 1 is a block diagram showing electrical connection of an embodiment of a multi-point temperature sensing system according to the present invention.
Figure 2:
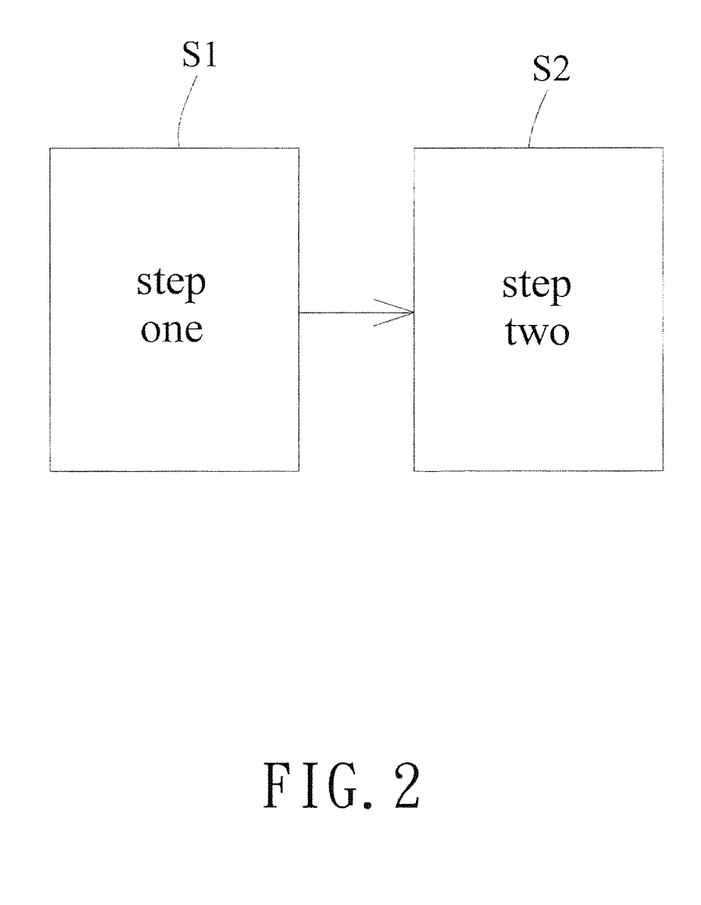
FIG. 2 is a schematic drawing showing steps of an embodiment of a multi-point temperature sensing method according to the present invention.

Refer to FIG. 1, a block diagram showing electrical connection of a multi-point temperature sensing system is revealed. A flow chart showing steps of a multi-point temperature sensing method is disclosed in FIG. 2. The multi-point temperature sensing method including a first step S1 and a second step S2 can be applied to the multi-point temperature sensing system shown in FIG. 1 for dramatically reducing the area the conventional temperature sensors occupied. Thus a large amount of temperature sensors can be used in blocks 11 inside an integrated circuit (IC) chip 1 without occupying too much area. The multi-point temperature sensing system of the present invention includes at least one slave temperature sensor 2 mounted in the block 11 and a master temperature sensor 3.

The slave temperature sensors 2 are arranged at preset positions of the block 11 the user intend to measure the temperature. In this embodiment, the IC chip 1 can be a microprocessor chip or a System-on-a-chip (SoC). When the IC chip 1 is a SoC, it includes a plurality of blocks 11 that execute specific functions and tasks such as blocks of digital circuit, analog circuit, mixed signal circuit or radio frequency circuit, etc. For example, in FIG. 1, the IC chip 1 includes six blocks 11, but the number is not limited to six. In other embodiments, the IC chip 1 has more or fewer circuit blocks 11. And at least one slave temperature sensor 2 is built in each circuit block 11 for measuring working temperature at a certain position of the block 11.

Figure 3:
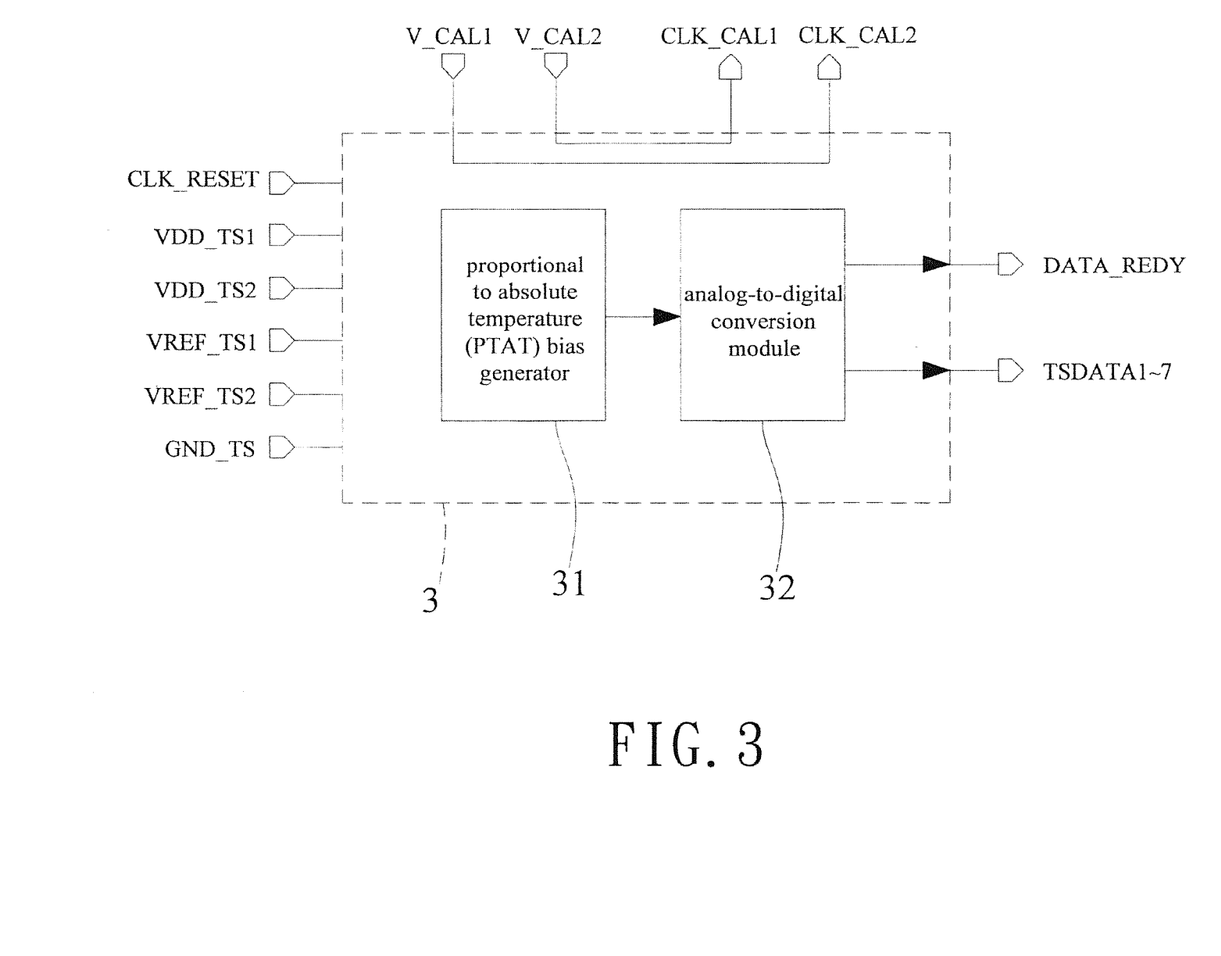
FIG. 3 is a block diagram showing electrical connection of an embodiment of a master temperature sensor according to the present invention.
Figure 4:
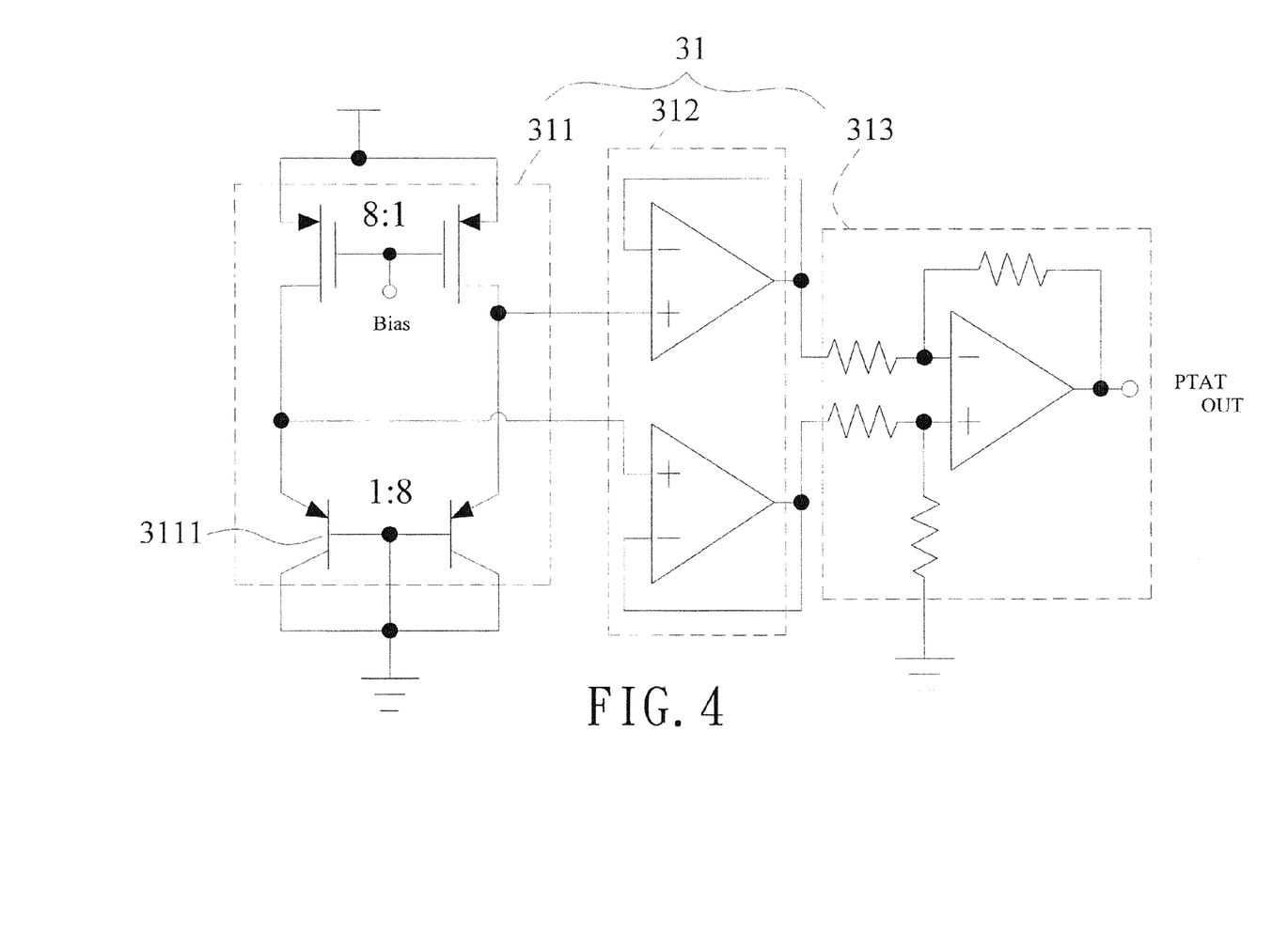
FIG. 4 is a circuit diagram of a proportional to absolute temperature (PTAT) bias generator according to the present invention.

The master temperature sensor 3 is mounted in the IC chip 1 and is electrically connected to the slave temperature sensor 2. The master temperature sensor 3 is used to correct variations of the slave temperature sensor 2 induced by variations of process, voltage and temperature (PVT). As shown in FIG. 3, the master temperature sensor 3 consists of a proportional to absolute temperature (PTAT) bias generator 31 and an analog-to-digital conversion module 32 that receives signals from the PTAT bias generator 31. The analog-to-digital conversion module 32 is a successive approximation analog-to-digital converter (SAR ADC). In implementation, a front-end circuit with certain precision generates a linear signal that is proportional to the absolute temperature (PTAT). Then the linear signal is converted into digital code by the SAR ADC. The master temperature sensor 3 needs a larger area for implementation due to disposition of the PTAT bias generator 31 that generates precise PTAT signals and the analog-to-digital conversion module 32 that converts signals to digital codes. Refer to FIG. 4, a circuit diagram of the PTAT bias generator 31 according to the present invention is revealed. The PTAT bias generator 31 includes a PTAT reference voltage generator circuit 311 having a pair of bipolar junction transistors (BJT) 3111, a buffer circuit 312 that receives signals output from the PTAT reference voltage generator circuit 311 (voltage differential signal between the two BJT) and an operational amplifier circuit 313 that receives and amplifies signals output from the buffer circuit 312. The embodiment is implemented mainly by the concept that the PTAT reference voltage generator circuit 311 generates a PTAT signal. Finally the signal is amplified by the operational amplifier circuit 313 and then is sampled by the analog-to-digital converter. It should be noted that the above PTAT bias generator 31 is only an embodiment of the present invention and is able to be replaced by a current generator with linear positive temperature dependence revealed in the Taiwanese Pat. Pub. No. I337694 "Bandgap reference circuit". The current generator with linear positive temperature dependence has the same function as the PTAT bias generator 31 of the present invention and should be considered as an equivalent change or modification.

Figure 5:
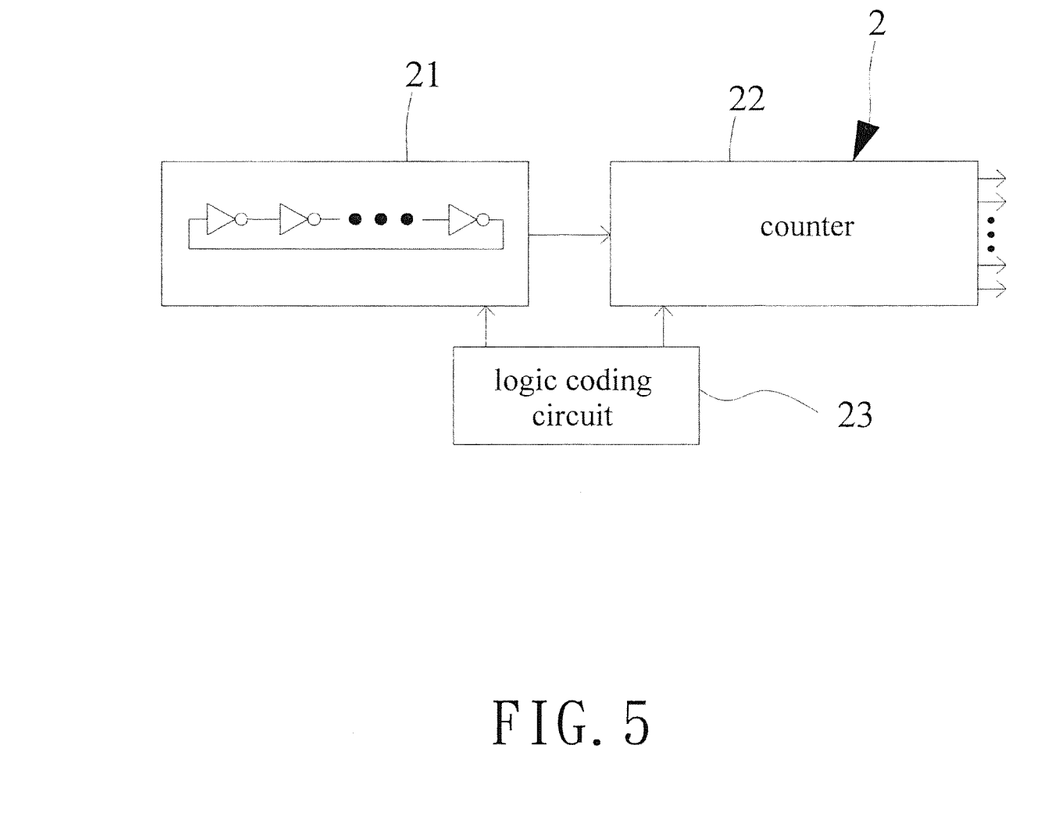
FIG. 5 is a block diagram showing electrical connection of an embodiment of a slave temperature sensor according to the present invention.

Moreover, refer to FIG. 5, a schematic drawing showing electrical connection of the slave temperature sensor 2 is revealed. The slave temperature sensor 2 includes an oscillator 21 and a counter 22 electrically connected to the oscillator 21. The oscillator 21 has an oscillation frequency that is controlled by a logic coding circuit 23 and is changed linearly along with the temperature being detected. Then the oscillation frequency is recorded by the counter 22 and the counting result is output. It should be noted that the slave temperature sensor 2 mentioned above is only a preferred embodiment. It has similar function to the temperature sensing unit in the technique revealed in the Taiwanese Pat. I368839. This is an equivalent replacement and should be considered as an equivalent change or modification. Although the linearity of the slave temperature sensor 2 is not high and is easy to have offset with the process, it has simple structure and small area. The layout area of the slave temperature sensor 2 is around one fortieth (1/40) of that of the master temperature sensor 3. Thus the area of the temperature sensors occupied in the IC chip 1 is dramatically reduced. Therefore a large amount of temperature sensors can be applied to each block 11 inside the IC chip 1 without occupying too much area.

Figure 6:
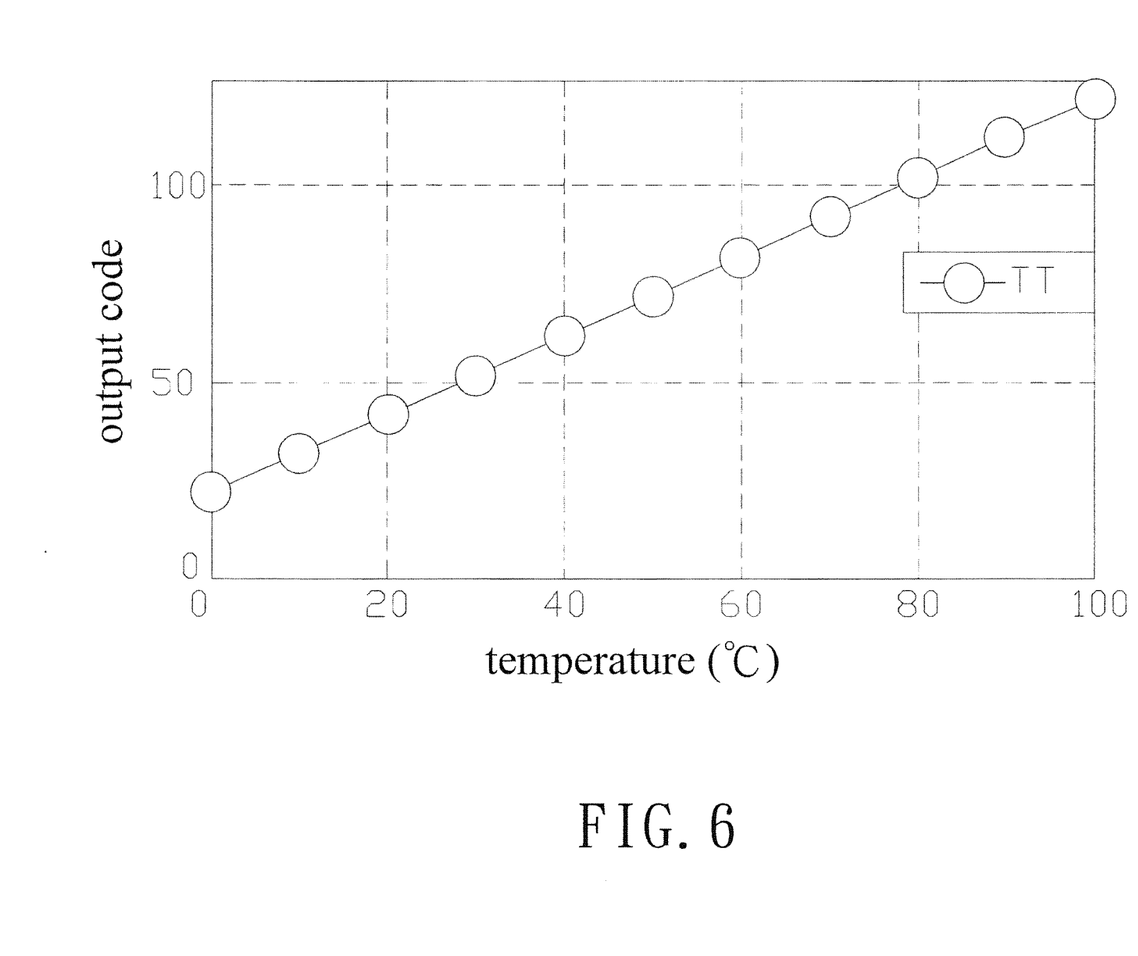
FIG. 6 is a post-simulation result of a master temperature sensor at a position TT of an integrated circuit chip according to the present invention.
Figure 7:
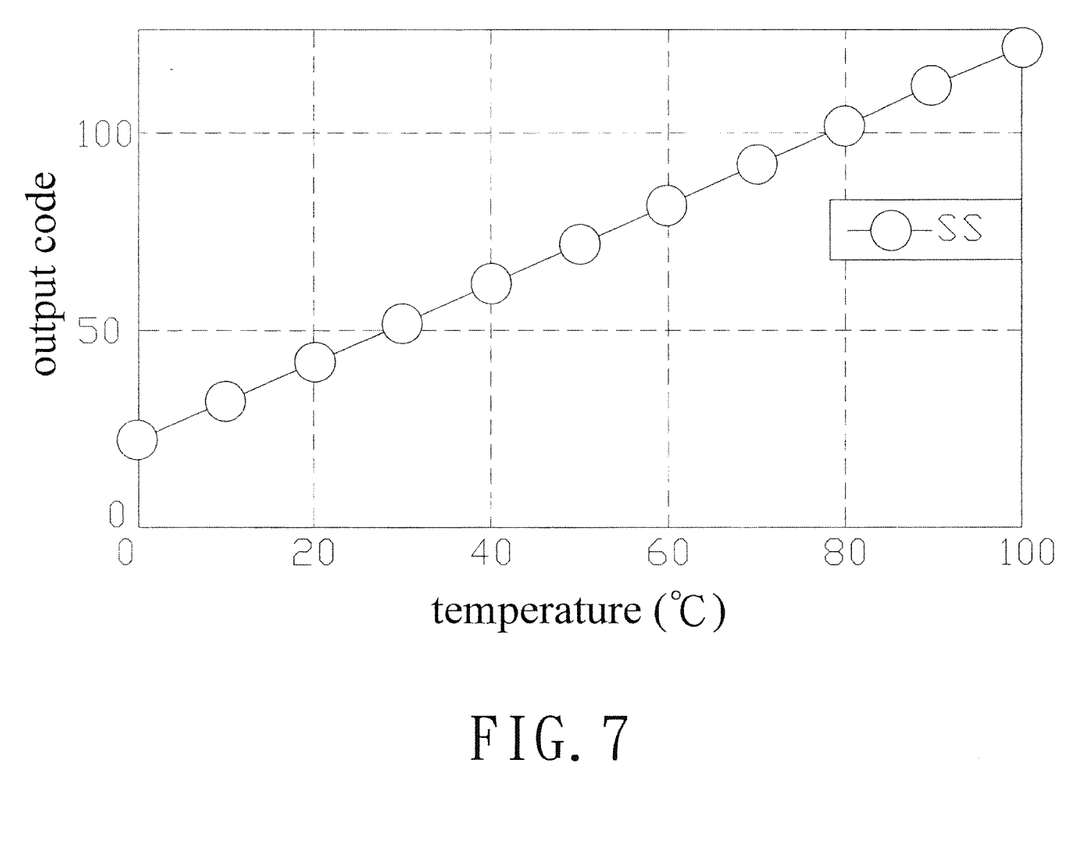
FIG. 7 is a post-simulation result of a master temperature sensor at a position SS of an integrated circuit chip according to the present invention.
Figure 8:
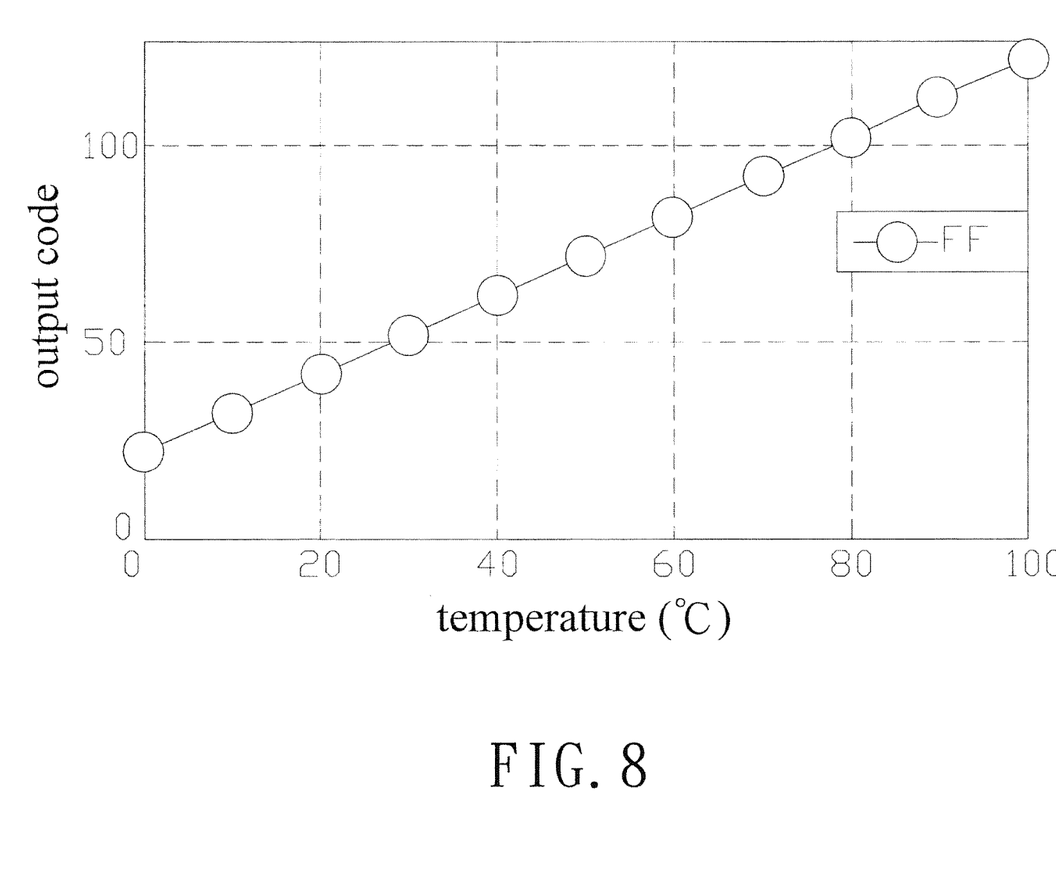
FIG. 8 is a post-simulation result of a master temperature sensor at a position FF of an integrated circuit chip according to the present invention.

While in use, the offset/variation is reduced by output of the master temperature sensor 3 in the offset correction way when the slave temperature sensor 2 has output offset/variation due to PVT variations. This is due to that the output code of the master temperature sensor 3 will not change a lot in relative to the process offset. For example, post-simulation results at three corners (TT, SS and FF) of an IC chip 1 are respectively shown in FIG. 6, FIG. 7 and FIG. 8. When the input temperature of the master temperature sensor 3 is 0 degrees Celsius, the output code is 22. When the input temperature is 100° C., the output code is 122. The change of the code is 1 per 1 degree Celsius. The precision of linearity is 1 degree Celsius. Thus it is reasonably understood that the output code of the master temperature sensor 3 will not have a great change in relative to the process offset and its linearity in the range of 0° C. to 100° C. is ideal (with the precision of 1 degree Celsius). Therefore the master temperature sensor 3 can be used to correct the slave temperature sensor 2 electrically connected thereto.

Figure 9:
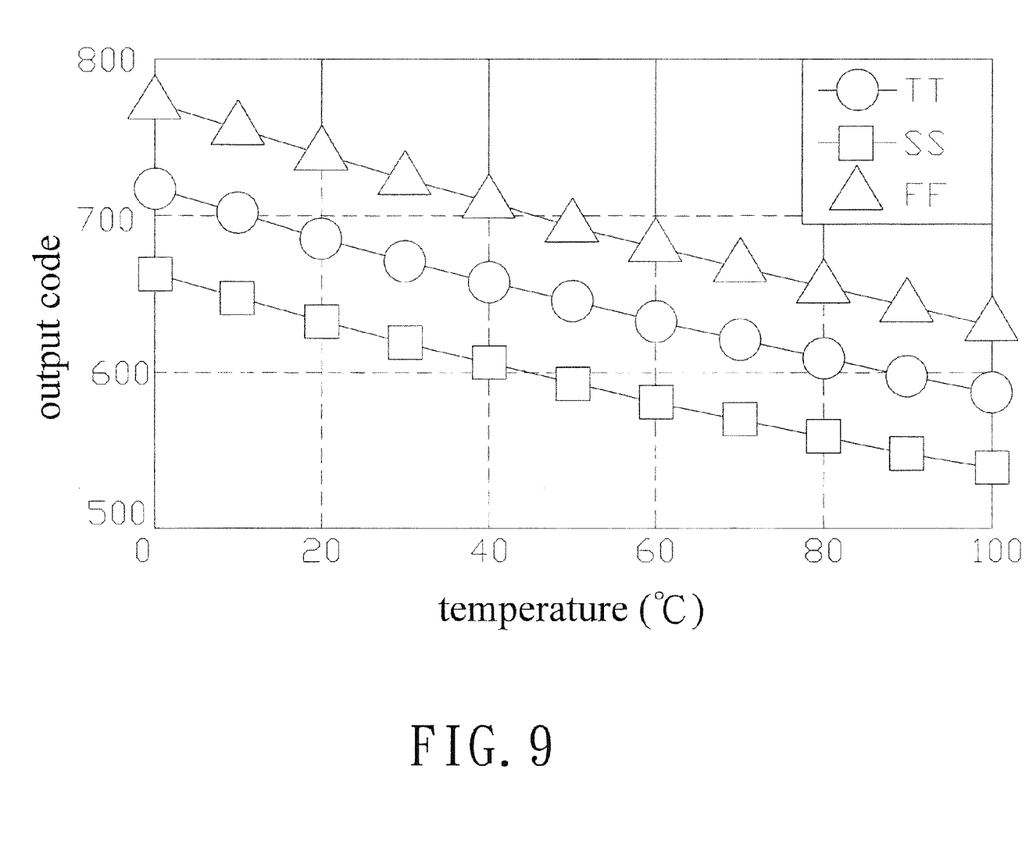
FIG. 9 shows post-simulation results of a salve temperature sensor at positions TT, SS and FF of an IC chip according to the present invention.
Figure 10:
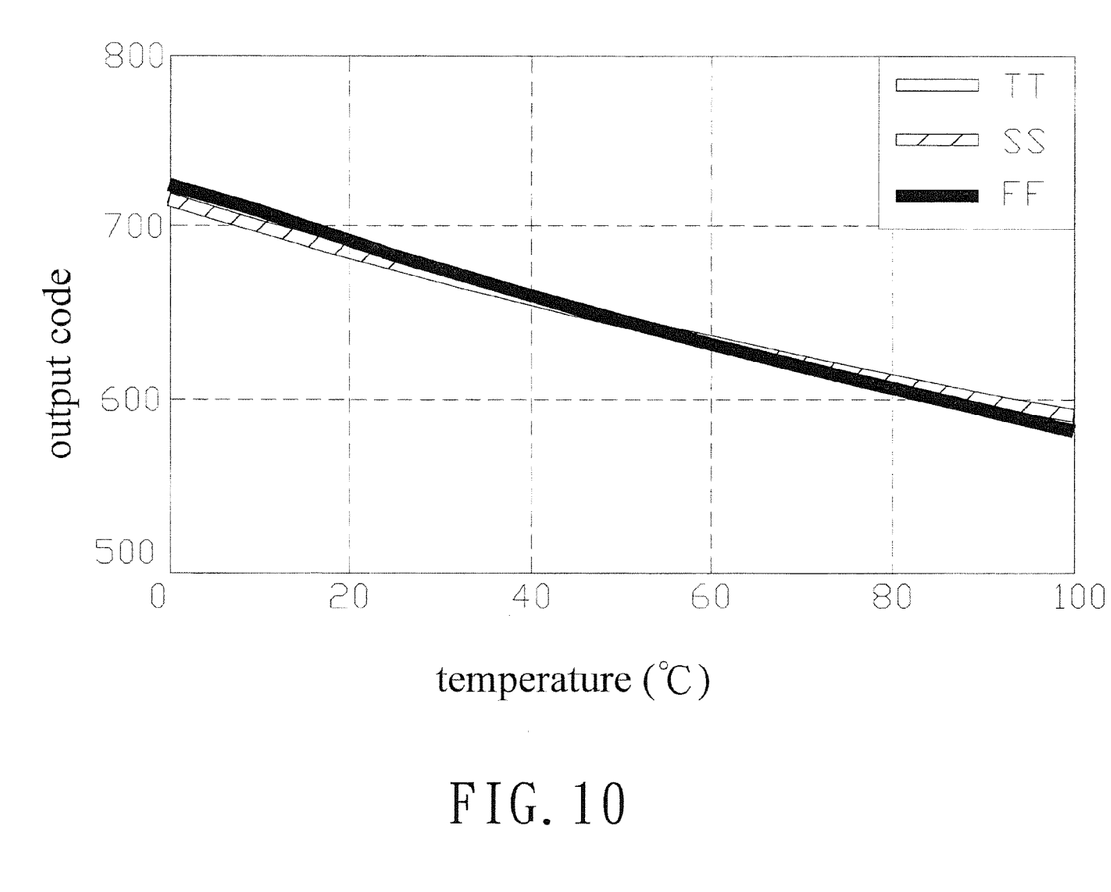
FIG. 10 shows post-simulation results at positions TT, SS and FF of an IC chip after variations of a salve temperature sensor generated due to PVT variations being corrected by a master temperature sensor according to the present invention.

Refer to FIG. 9, post-simulation results of the salve temperature sensor 2 of the present invention at three corners (TT, SS and FF) of the IC chip 1 are respectively shown. It is clear that the output code of the salve temperature sensor 2 at different corner changes a lot. At the corner TT, the output code is 717 when the temperature is 0 degrees Celsius. The output code is 587 when the temperature is 100 degrees Celsius. At the corner SS, the output code is 663 when the temperature is 0 degrees Celsius. The output code is 539 when the temperature is 100 degrees Celsius. At the corner FF, the output code is 771 when the temperature is 0 degrees Celsius. The output code is 630 when the temperature is 100 degrees Celsius. After the variations of the salve temperature sensor 2 generated due to PVT variations being corrected by the master temperature sensor 3, the simulation results are shown in FIG. 10. It is clear that the variation of the output code at each corner is reduced. Moreover, the layout area of the salve temperature sensor 2 is 0.001 mm$^2$, about 1/39 of that of the master temperature sensor 3. Thereby the area the temperature sensors required in the IC chip 1 is significantly reduced and the stability of the temperature control system is improved. The problem of conventional SoC (System-on-a-chip) that only a limited number of temperature sensors could be used due to the area they occupied can be solved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A multi-point temperature sensing system for an integrated circuit chip having a plurality of blocks executing specific functions comprising:

at least one slave temperature sensor mounted in each block, each slave temperature sensor being arranged at a preset position on the corresponding block for measuring temperature thereat; and a master temperature sensor embedded in the integrated circuit chip and electrically connected to the slave temperature sensors; wherein the master temperature sensor corrects temperature measurements of the slave temperature sensor, the master temperature sensor including corrective circuitry for removing error from the temperature measurements due to a variation characteristic of the slave temperature sensor based on process, voltage and temperature.

2. The system as claimed in claim 1, wherein the master temperature sensor includes a proportional to absolute temperature (PTAT) bias generator and an analog-to-digital conversion module that receives signals from the PTAT bias generator.

3. The system as claimed in claim 2, wherein the analog-to-digital conversion module is a successive approximation analog-to-digital converter (SAR ADC).

4. The system as claimed in claim 2, wherein the PTAT bias generator includes a PTAT reference voltage generator circuit having a pair of bipolar junction transistors (BJT), a buffer circuit that receives signals output from the PTAT reference generator circuit, and an operational amplifier circuit that receives and amplifies signals output from the buffer circuit.

5. The system as claimed in claim 1, wherein the slave temperature sensor includes an oscillator and a counter electrically connected to the oscillator; the oscillator has an oscillation frequency that is controlled by a logic coding circuit and is changed linearly along with temperature being detected; the counter records the oscillation frequency and outputs counting results.

6. The system as claimed in claim 1, wherein a layout area of the slave temperature sensor is around one fortieth (1/40) of a layout area of the master temperature sensor.

7. A multi-point temperature sensing method for an integrated circuit chip having a plurality of blocks executing specific functions comprising:
    embedding at least one slave temperature sensor in each block, each slave temperature sensor being arranged at a preset position on the corresponding block for measuring temperature thereat; and
    mounting a master temperature sensor in the integrated circuit chip, electrically connecting the master temperature sensor to the slave temperature sensors, and using the master temperature sensor to correct temperature measurements of the slave temperature sensor, the master temperature sensor including corrective circuitry for removing error from the temperature measurements due to a variation characteristic of the slave temperature sensor based on process, voltage and temperature (PVT).

8. The method as claimed in claim 7, wherein the master temperature sensor removes error from the temperature measurements of the slave temperature sensor by using offset correction circuitry.

9. The method as claimed in claim 7, wherein the master temperature sensor includes a proportional to absolute temperature (PTAT) bias generator and an analog-to-digital conversion module that receives signals from the PTAT bias generator and converts the signals to digital codes.

10. The method as claimed in claim 9, wherein the analog-to-digital conversion module is a successive approximation analog-to-digital converter (SAR ADC).

11. The method as claimed in claim 9, wherein the PTAT bias generator includes a PTAT reference voltage generator circuit having a pair of bipolar junction transistors (BJT), a buffer circuit that receives signals output from the PTAT reference generator circuit, and an operational amplifier circuit that receives and amplifies signals output from the buffer circuit.

12. The method as claimed in claim 7, wherein the slave temperature sensor includes an oscillator and a counter electrically connected to the oscillator; the oscillator has an oscillation frequency and the oscillation frequency is controlled by a logic coding circuit and is changed linearly along with temperature being detected; the counter records the oscillation frequency and outputs counting results.

13. The method as claimed in claim 7, wherein a layout area of the slave temperature sensor is around one fortieth (1/40) of a layout area of the master temperature sensor.

* * * * *